(12) United States Patent
Trachy (10) Patent No.: US 9,645,738 B2
(45) Date of Patent: May 9, 2017

(54) DIRECT MEMORY ACCESS OF REMOTE DATA

(75) Inventor: David Lee Trachy, Longmont, CO (US)

(73) Assignee: Spectra Logic Corporation, Boulder, CO (US)

( * ) Notice: Subject to any disclaimer, the term of this patent is extended or adjusted under 35 U.S.C. 154(b) by 200 days.

(21) Appl. No.: 13/571,213

(22) Filed: Aug. 9, 2012

(65) Prior Publication Data

US 2014/0047058 A1 Feb. 13, 2014

(51) Int. Cl.
*G06F 15/16* (2006.01)
*G06F 13/28* (2006.01)
*G06F 3/06* (2006.01)

(52) U.S. Cl.
CPC ............ *G06F 3/0605* (2013.01); *G06F 3/065* (2013.01); *G06F 3/067* (2013.01); *G06F 3/0617* (2013.01); *G06F 3/0658* (2013.01)

(58) Field of Classification Search
CPC ... H04L 29/06; H04L 47/10; H04L 29/08072; H04L 29/06027; H04L 29/08117; H04L 49/90; G06F 13/28; G06F 13/385; G06F 13/30; G06F 12/1081
USPC ............................................. 710/11; 709/232
See application file for complete search history.

(56) References Cited

U.S. PATENT DOCUMENTS

| | | | | |
|---|---|---|---|---|
| 5,398,324 A * | 3/1995 | Matida | .................. | G06F 3/0601 710/22 |
| 6,795,874 B2 | 9/2004 | Martin et al. | | |
| 7,143,206 B2 * | 11/2006 | Oda | ........................ | G06F 3/061 710/22 |
| 7,304,646 B2 | 12/2007 | Iwata | | |
| 7,398,335 B2 * | 7/2008 | Sonksen | ................. | G06F 13/28 709/232 |
| 7,600,088 B1 * | 10/2009 | Clark | .................. | G06F 11/2066 711/111 |
| 7,620,748 B1 * | 11/2009 | Bruce | ..................... | G06F 13/28 710/22 |
| 2004/0024807 A1 | 2/2004 | Cabrera et al. | | |
| 2004/0261050 A1 | 12/2004 | Broberg, III et al. | | |
| 2005/0050244 A1 * | 3/2005 | Oda | ........................ | G06F 3/061 710/33 |
| 2006/0140008 A1 * | 6/2006 | Hirako | .................. | G06F 3/0613 365/185.22 |
| 2007/0162640 A1 * | 7/2007 | Johns | ...................... | G06F 13/28 710/22 |
| 2008/0016291 A1 * | 1/2008 | Adachi | ................... | G06F 3/061 711/154 |

(Continued)

*Primary Examiner* — Mahran Abu Roumi
(74) *Attorney, Agent, or Firm* — Kenneth Altshuler (57) ABSTRACT

An apparatus and associated methodology providing a data storage system operably transferring data between a storage space and a remote device via a network. The data storage system includes a first storage controller having top-level control of a first data storage device and a second storage controller having top-level control of a second data storage device that is different than the first data storage device, the first and second data storage devices forming portions of the storage space. Data pathway logic resides in the first storage controller that performs a direct memory access (DMA) transfer to the second data storage device at a DMA data transfer rate in response to the first storage controller receiving, from the external device via the network, an access request for the second data storage device.

8 Claims, 7 Drawing Sheets

(56) References Cited

U.S. PATENT DOCUMENTS

| | | |
|---|---|---|
| 2008/0186052 A1 | 8/2008 | Needham et al. |
| 2009/0157913 A1* | 6/2009 | Bellows .................. G06F 13/28 710/22 |
| 2010/0030927 A1* | 2/2010 | Heard ..................... G06F 13/28 710/23 |
| 2010/0064071 A1* | 3/2010 | Shimokawa ............ G06F 13/28 710/25 |
| 2010/0100649 A1 | 4/2010 | Madukkarumukumana et al. |
| 2010/0153590 A1 | 6/2010 | Hsin et al. |
| 2010/0228894 A1* | 9/2010 | Strulovici ............... G06F 12/08 710/25 |
| 2010/0325480 A1 | 12/2010 | Ghanem et al. |
| 2011/0161543 A1 | 6/2011 | Van Holder et al. |
| 2012/0030382 A1 | 2/2012 | Kim |
| 2012/0072523 A1 | 3/2012 | Michels et al. |
| 2012/0110232 A1 | 5/2012 | Amitay et al. |
| 2012/0221813 A1* | 8/2012 | Inoue .................. G06F 11/2064 711/162 |
| 2013/0067123 A1* | 3/2013 | Rizzo ..................... G06F 13/12 710/22 |
| 2013/0145372 A1* | 6/2013 | Liu .......................... G06F 9/52 718/102 |

* cited by examiner

DIRECT MEMORY ACCESS OF REMOTE DATA

CROSS-REFERENCE TO RELATED APPLICATIONS

None.

BACKGROUND OF THE INVENTION

Field of the Invention

The present embodiments relate generally to a storage element array suited for use in a distributed storage system and more particularly but without limitation to direct memory access of remote data in a distributed storage system.

Description of Related Art

The combination of multiple storage devices into distributed data storage capacity has proliferated in response to market demands for storing enormous amounts of data that can be readily retrieved in a fast, reliable, and efficient manner.

With continued demands for ever increased levels of storage capacity and data transfer throughput performance, there remains an ongoing need for improvements in the manner in which the storage elements in such data storage arrays are operationally managed in order to optimize the capacity and data throughput performance parameters while minimizing storage expense. It is to these and other related improvements that preferred embodiments of the present invention are generally directed.

SUMMARY OF THE INVENTION

Some embodiments of the present invention contemplate a data storage system operably transferring data between a storage space and a remote device via a network. The data storage system includes a first storage controller having top-level control of a first data storage device and a second storage controller having top-level control of a second data storage device that is different than the first data storage device, the first and second data storage devices forming portions of the storage space. Data pathway logic resides in the first storage controller that performs a direct memory access (DMA) transfer to the second storage device at a DMA data transfer rate in response to the first storage controller receiving, from the external device via the network, an access request for the second data storage device.

Some embodiments of the present invention contemplate a data storage system operably transferring data between a storage space and a remote device via a network. The data storage system includes a plurality of storage controllers each having top-level control of respective data storage devices, the data storage devices collectively forming the storage space. A routing table maps the storage space and is indexable by storage location. In response to receiving an access request from the remote device, data pathway logic indexes the routing table, identifies a subset of the plurality of storage controllers that each has control over a data storage device corresponding to the access request, selects one of the storage controllers in the subset, and performs a remote DMA transfer to the selected data storage device at a DMA data transfer rate.

Some embodiments of the present invention contemplate a method of transferring data between a storage space and a remote device via a network, the method including: obtaining a data storage system including a first storage controller having top-level control of a first data storage device and a second data storage device having top-level control of a second data storage device; the first storage controller receiving an access request for the second data storage device; and in response to the receiving, the first storage controller performing a remote DMA transfer to the second data storage device at a DMA data transfer rate.

DETAILED DESCRIPTION

Initially, it is to be appreciated that this disclosure is by way of example only, not by limitation. The user data set transfer concepts herein are not limited to use or application with any specific system or method for using storage element devices. Thus, although the instrumentalities described herein are for the convenience of explanation, shown and described with respect to exemplary embodiments, it will be appreciated that the principles herein may be applied equally in other types of storage element systems and methods involving the storage and retrieval of data.

Figure 1:
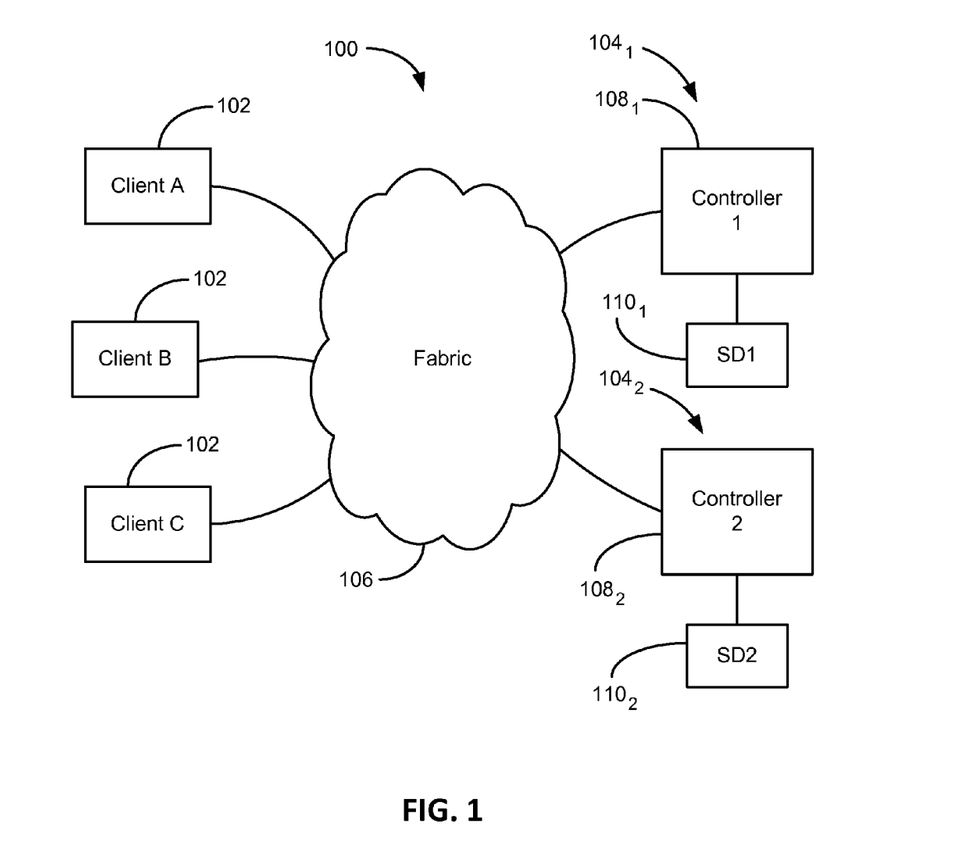
FIG. 1 is a functional block depiction of a distributed storage system utilizing a storage device array that is constructed in accordance with embodiments of the present invention.

To illustrate an exemplary environment in which preferred embodiments of the present invention can be advantageously practiced, FIG. 1 shows a data storage system 100 characterized as providing a storage area network (SAN) utilizing mass storage. The system 100 includes a number of processing client devices 102, respectively identified as clients A, B, and C. The clients 102 can interact with each other as well as with a pair of data storage arrays 104 (denoted 1 and 2, respectively) via a fabric 106. The fabric 106 is preferably characterized as Ethernet, although other configurations can be utilized as well, including the Internet. Data is transferred between the clients 102 and the storage arrays 104 by executing input/output (I/O) commands. Generally, an I/O command can originate from either a client 102 or a storage array 104 to store data to or retrieve previously stored data from a storage array 104.

Each storage array 104 includes one or more controllers 108 and a set of data storage devices ("SD") 110. It is further contemplated that in some embodiments the A client 102 and the first data storage array $104_1$ can be physically located at a first site, the B client 102 and second storage array $104_2$ can be physically located at a second site, and the C client 102 can be yet at a third site, although such is merely illustrative and not limiting.

Figure 2:
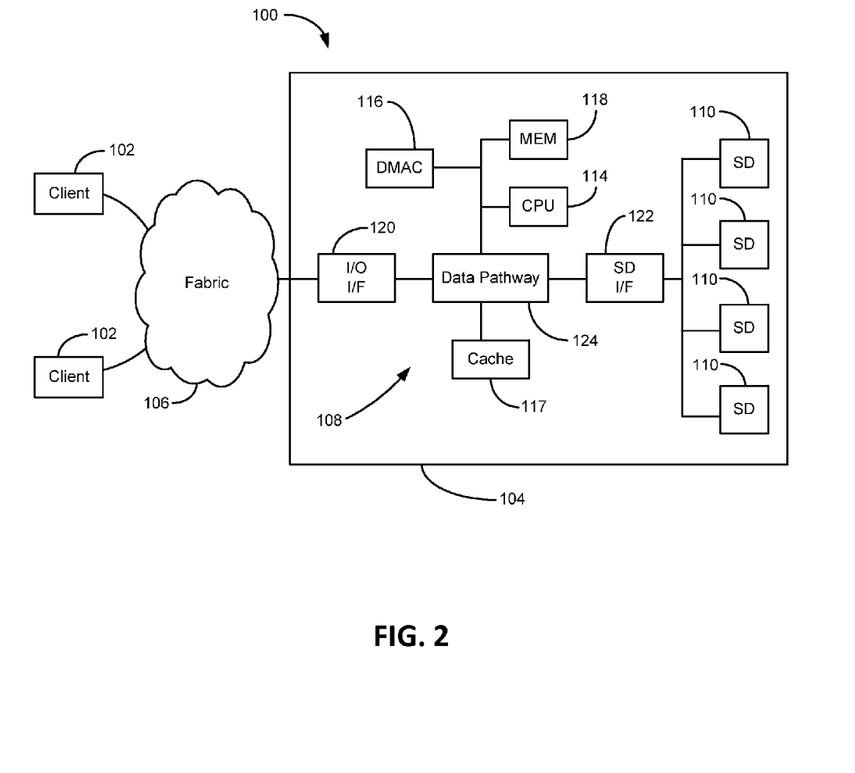
FIG. 2 is a functional block depiction of a portion of the storage device array of FIG. 1.

FIG. 2 diagrammatically depicts illustrative embodiments of the data storage system 100 in which one of the storage arrays 104 is connected to the clients 102 to transfer user data with a number of storage devices ("SD") 110 that are individually selectable to transfer the user data by executing the I/O commands via the switchable fabric 106. The storage devices 110 can be, without limitation, removable media data storage drives such as those employing magnetic, optical, and solid-state digital data storage capability. For purposes of this description and meaning of the claimed subject matter the term "user data" or "data" means data that is transferred to the storage array 104 and that is retrieved from the storage array 104 as the result of a user of the data storage system 100 interfacing, either directly or indirectly, with one or more of the clients 102. For example, without limitation, the client 102 can be a computational device with a user interface permitting the user to either store information of quantitative or qualitative value (such as a document), or to retrieve such previously stored information. That is, when a user of a computer selects menu options "file," "save," and designates a "filename," the computer saves user data corresponding to the computer readable content (such as a document, spreadsheet, drawing, and the like) to a data storage device 110. It is noted that the computer system in handling file data also handles non-file object-oriented programming language structures such as inodes. During a transfer the file data is accompanied by the non-file data, sometimes referred to as metadata, that provides system information for properly routing and processing the user data in order to reliably store and retrieve it. The metadata informs the data storage system of pertinent details such as what type of data format is being transferred, the file name, redundancy identifiers, and the like.

In these illustrative embodiments each of the remote clients 102 can view the entire physical storage capacity (via the storage devices 110) of the storage array 104 as a unified storage space. The storage array 104, the client 102, or a network appliance (not shown) virtualizes the physical storage space to a logical addressing nomenclature. The storage array 104 also buffers data being transferred between the clients 102 and the storage devices 110 to optimize I/O throughput performance, such as by employing writeback commands that temporarily store user data and acknowledge the write as being complete before that transfer of user data is actually completed via the storage devices 110. The storage array 104 can also advantageously employ predetermined fault tolerance arrangements in which parallel, redundant links store at least some of the user data so that a redundant copy of the user data can be retrieved or reconstructed in the event that the primary copy of the user data becomes unavailable.

The circuitries represented by the functional block depiction in FIG. 2 and otherwise throughout this description generally can be embodied in a single integrated circuit or can be distributed among a number of discrete circuits as desired. In these illustrative embodiments, a main processor (CPU) 114, preferably characterized as a programmable computer processor, provides top-level control in accordance with programming steps and processing data stored in non-volatile memory (such as flash memory or similar) and in dynamic random access memory (DRAM). The CPU 114 can be any processing circuit capable of executing computer instructions, such as an embedded microprocessor, a microcontroller, a state-machine, a digital signal processor (DSP), and the like. Furthermore, the CPU 114 can have multiple core processing elements functioning simultaneously and independently of each other.

A direct memory access control (DMAC) 116 facilitates the process of transferring data by offloading tasks from the CPU 114. An I/O interface 120 provides signal conditioning and buffering for the CPU 114 and the DMAC 116 regarding signal transmissions with the network 106. The I/O interface 120 can include application specific drivers and logic to support communications via the network 106, such as PCI, Ethernet, inter-integrated circuit ($I^2C$), universal serial bus (USB), IEEE-1394 (FireWire), control area network bus (CAN), proprietary network or bus formats, and the like.

A memory, such as the cache 117, temporarily stores (buffers) unexecuted I/O commands and corresponding user data until such a time that they are executed to effect the transfer of the user data via the storage devices 110. Another control memory 118 is employed to store system information and instructions. Examples of a control memory device 118 include, but are not limited to, solid state memory devices, magnetic disk drives, rotating memory devices, general random access memory devices, etc. Certain embodiments contemplate the control memory device 118 providing data recall (and data storage) at a significantly faster rate than that of the data storage devices 110.

The I/O interface 120, a storage device interface 122, and data pathway logic 124 form a pass-through communication path for commands and data between the storage devices 110 and the client(s) 102. Again, although illustrated discretely, it will be understood that the data pathway logic 124 and the corresponding I/F circuits 120, 122 can be unitarily constructed.

Figure 3:
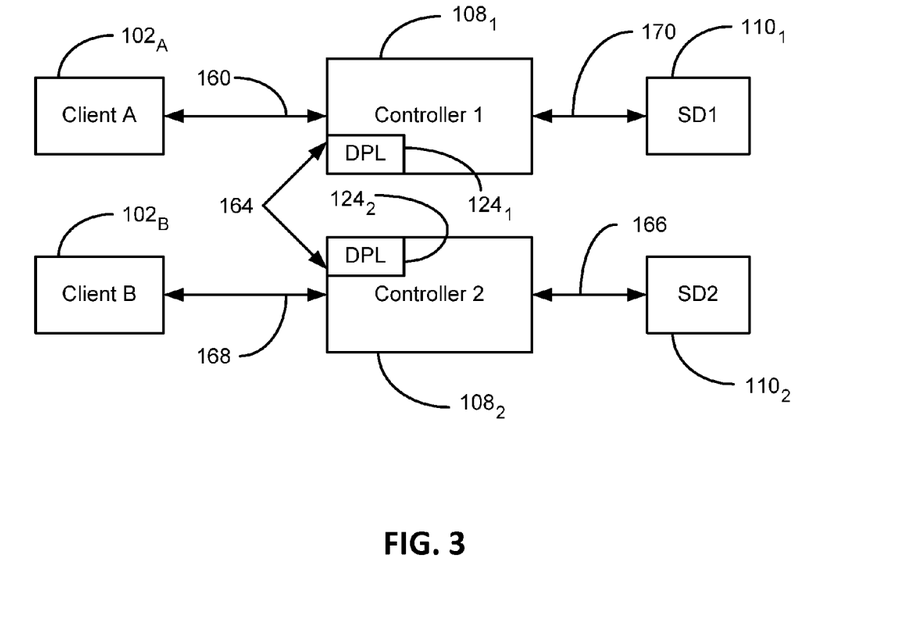
FIG. 3 is a diagrammatical block depiction of data pathways over which the non-mastered controller performs remote direct memory access transfers in accordance with embodiments of the present invention.

FIG. 3 diagrammatically depicts pertinent parts of the data storage system 100 in accordance with illustrative embodiments of the present invention, wherein the controller $108_1$ has top-level control of the storage device $110_1$ and the controller $108_2$ has top-level control of the storage device $110_2$. By "top-level" control it is meant that for purposes of storage space virtualization the controller $108_1$ has ultimate control of the status of the data residing in the storage device $110_1$ in order to maintain data coherence. This is sometimes referred to herein as the controller $108_1$ being the master controller of the data storage device $110_1$, although other controllers $108_n$ can likewise access the data storage device $110_1$ but must account to the master controller $108_1$ in doing so in order to maintain system-wide coherency as data is updated.

However, under certain circumstances it can be advantageous for the controller $108_1$ to receive via network link 160 an access request for the non-mastered storage device $110_2$. For that purpose each of the controllers $108_1$, $108_2$ has hardware responsive to the data pathway logic ("DPL") $124_1$, $124_2$ residing therein and connected via the addressable link 164 enabling the controller $108_1$ to perform direct memory access (DMA) transfers of the storage device $110_2$. Hence, generally, it will be appreciated that client A can access storage device $110_2$ via the combined data pathways 160, 164, 166. Likewise, the client B can access storage device $110_1$ via the combined data pathways 168, 164, 170.

Figure 4:
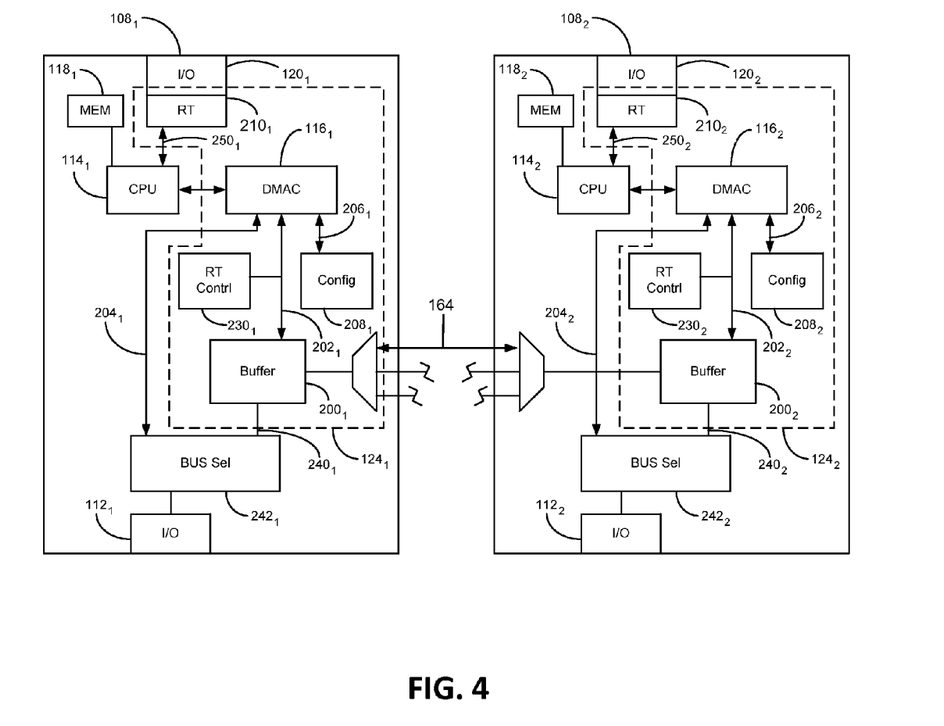
FIG. 4 is a functional block depiction of the two controllers in FIG. 5.

FIG. 4 is a functional block depiction of the controllers $108_1$, $108_2$ in accordance with illustrative embodiments of the present invention. A description of the controller $108_1$ that follows is equally descriptive of the other controller $108_2$ to the extent that the same base reference numbers are used.

The DMAC $116_1$ is configurable by the CPU $114_1$, allowing the CPU $114_1$ to control such features as a DMA source address, a DMA destination address, a transfer word count, and trigger events, such as a processor interrupt. In these embodiments the DMAC $116_1$ is operably coupled to a buffer $200_1$ for ultimately transferring data to the other controller $108_2$ via the bus 164 to satisfy access requests for non-mastered data. The DMAC $116_1$ is also operably coupled to the drive I/F $122_1$ via a bus $204_1$ to satisfy access requests for mastered data. Those data links are intentionally separate from a link $206_1$ that operably passes configuration and status information. Separating the data busses $202_1$, $204_1$ from the bus $206_1$ advantageously dedicates respective data lines capable of maximum bandwidth transmission, free of control transmissions. That is, once the CPU $114_1$ initiates a DMA transfer, the CPU $114_1$ can thereafter simultaneously process other instructions and, as necessary, access the configuration/status bus $206_1$ without bus contention issues with the DMAC $116_1$. Under this mode of DMA control the DMAC $116_1$, not the CPU $114_1$, provides the pathway control of the access request (via corresponding data packets) from the network 106 via the I/O interface $120_1$. Particularly, the access request is satisfied with no participatory control of the CPU $114_1$. For purposes of this description and meaning of the claim, "no participatory control" means that the data transfer operations occur independently of and without placing any processing load upon the CPU $114_1$.

In these depicted embodiments the data storage logic $124_1$ includes a routing table $210_1$ residing in the I/O interface 120, although the contemplated embodiments are not so limited in that the routing table $210_1$ can reside elsewhere in equivalent alternative embodiments. The routing table $210_1$ maps the storage space, formed by the storage devices $110_1$, $110_2$, . . . $110_n$ to ascertain whether each access request is for the storage drive $110_1$ mastered by the recipient controller $108_1$ or not. If so, then the routing table $210_1$ and corresponding driver routes the access request for processing as a mastered access request; otherwise the routing table $210_1$ and corresponding driver routes the access request for processing as a non-mastered request.

The DMAC $116_1$, per the instruction from the routing table $210_1$, routes the access request either to the mastered storage device $110_1$ via the local DMA bus $204_1$ or to the appropriate non-mastered storage device $110_2$ via the remote DMA bus $202_1$.

The CPU $114_1$ can configure and read the status of the DMAC $116_1$ via the bus $206_1$. That is, a configuration and status register $208_1$ can appear as one or more register entries in the register map of the CPU $114_1$, and can likewise be mapped to other components as needed. In these illustrative embodiments, the configuration and status register $208_1$ is also mapped to a control line that enables and selectively addresses the bus 164 from the buffer $200_1$ to a predefined port address of the corresponding buffer $200_2$ in the controller $108_2$. The buss 164 is generally an addressable remote network connection, and can be a peripheral component interconnect (PCI) bus, a PCI express bus, a high-speed serial bus, and the like, or alternatively an intranet or an extranet such as the Internet, or a combination thereof, and implemented wirelessly or on a wire line network. This connection is categorically referred to as a "remote" network (or fabric) 106 connection because the data transfer communications by definition must pass through the network 106. For the purposes of this description and meaning of the claims the term "remote" has no other meaning. Particularly, the term "remote" does not signify or imply any minimum distance between the controllers $108_1$, $108_2$, and does not signify or imply any difficulty in communication between the controllers $108_1$, $108_2$, other than that the DMA transfers must pass through network 106.

Figure 5:
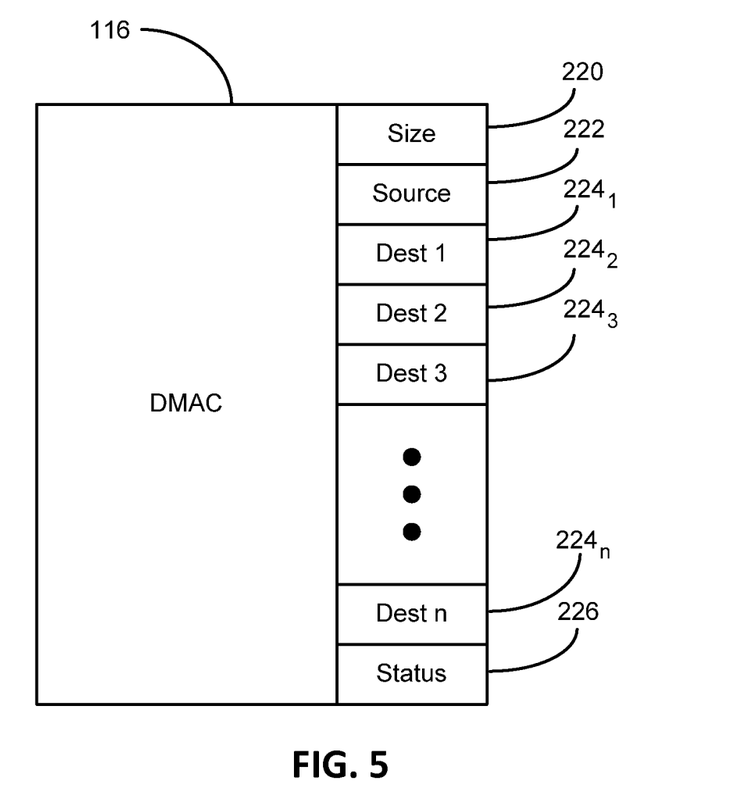
FIG. 5 is a functional block depiction of the direct memory access control in FIG. 6.

FIG. 5 diagrammatically depicts the DMAC $116_1$, $116_2$ in accordance with illustrative embodiments of the present invention having a number of registers that are loaded by the CPU $114_1$, $114_2$ with DMA transfer information. For example, a size register 220 contains data defining the size of the DMA transfer, such as the number of fixed-size data block transfers or the entire size of the data transfer. A source register 222 defines an addressable source from which the data can be obtained. A plurality of destination registers $224_1$, $224_2$, . . . $224_n$ defines one or more addressable destinations to which the data is to be transferred from the source. For example, without limitation, if the routing table $210_1$, $210_2$ indicates that a particular access request is a write request for redundant mirrored data, then the CPU $114_1$, $114_2$ writes destination registers $224_1$, $224_2$ . . . $224_n$ for both the primary and redundant copies of the data. Finally, a register 226 can be used to indicate when the CPU $114_1$, $114_2$ has instructed the DMAC $116_1$, $116_2$ to begin a DMA transfer.

Figure 6:
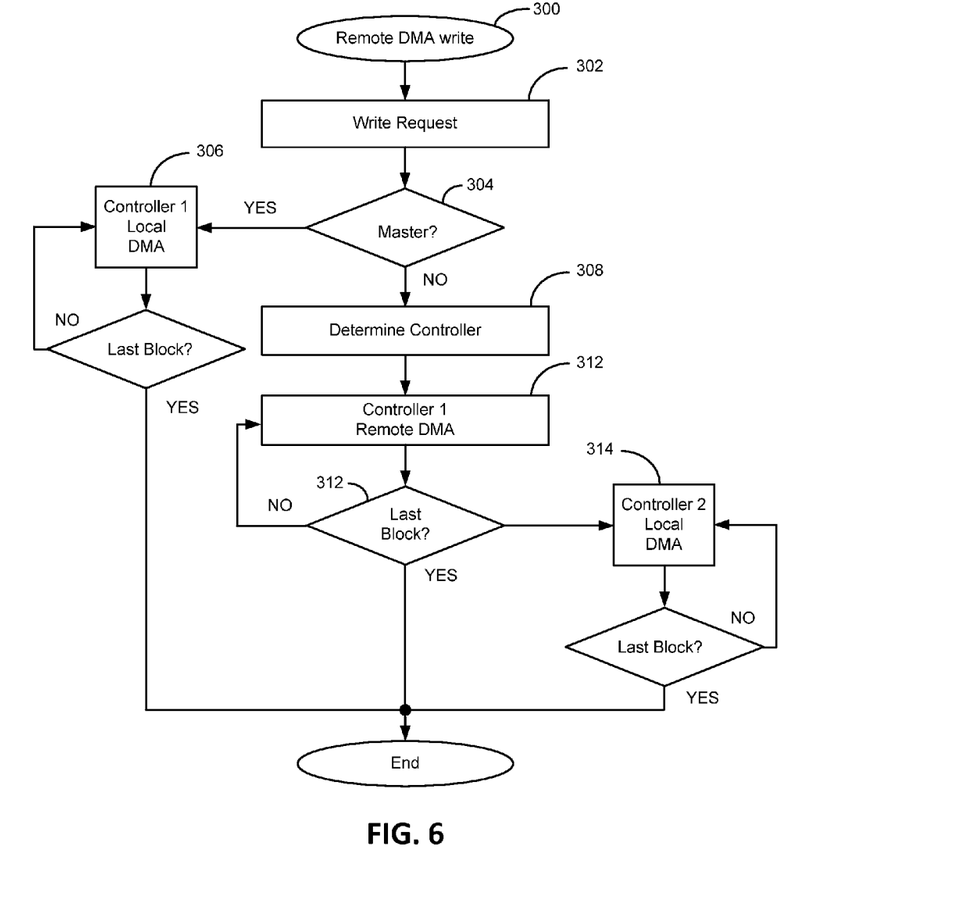
FIG. 6 is a flowchart depicting steps in a method for REMOTE DMA WRITE in accordance with embodiments of the present invention.

FIG. 6 is a flowchart depicting steps in a method 300 for a REMOTE DMA WRITE in accordance with illustrative embodiments of the present invention. The method 300 begins in the illustrative embodiments when in block 302 the storage controller $108_1$ receives an access request to write data to the storage space. In block 304 the data pathway logic $124_1$ executes stored computer instructions that compare the storage address(es) of the write request to the window of storage space mastered by the recipient storage controller $108_1$. If that comparison determines that the storage controller $108_1$ masters the storage space corresponding to the write request then control passes to block 306 where the CPU $114_1$ processes the write request locally to completion.

If, on the other hand, the determination of block 304 is that the storage space corresponding to the pending write request is not mastered by the controller $108_1$, then the CPU $114_1$ in block 308 indexes the routing table $210_1$ by the write request address to determine which one or more of the storage devices $110_n$ includes storage space corresponding to the write request. For purposes of this illustrative description it will be assumed the determination was made that storage device $110_2$ is the only such storage device of concern, and as such the remote DMA transfer is described in the following as occurring only to that storage device. However, in alternative equivalent embodiments two or more candidate storage devices $110_n$ can be identified. Where a redundant copy of the write data exists, for example, the data pathway logic $124_1$ can decide which of the two copies to store first. This can be advantageous when one of the two storage devices $110_n$ is unavailable at the time, such as in the event of a fault or perhaps the storage device $110_n$ is simply otherwise preoccupied with other data transactions. In an altered example of the current situation of a write request received by controller $108_1$ for storage device $110_2$, where it is determined that a redundant copy of the write request is stored in storage device $110_1$, then the DMAC $116_1$ would in that event advantageously write the data to both storage devices $110_1$, $110_2$.

Where two or more candidate controllers $108_n$ are identified, the data pathway logic $124_1$ can alternatively be constructed to favor the immediate storage to one of the candidate controllers $108_n$ based on a comparison of different data throughput performance capabilities. For example, without limitation, if redundancy is maintained in both a tape library and in a solid-state storage device, then the data pathway logic $124_1$ can advantageously store a copy to the faster solid-state storage device and schedule the slower copy to a tape drive $112_n$ in a manner that balances the total throughput requirements of the data storage system. Another advantageous comparison can be made based on the present size of DMA queues in the two or more candidate controllers $108_n$, indicating the present processing load demands on the candidate controllers $108_n$ in other processing activities.

With the target controller $108_n$ identified, controller $108_2$ for purposes of this illustrative example, the CPU $114_1$ in block 310 initializes data structures that, in turn perform participatory control by the DMAC $116_1$ of a remote DMA transfer by writing the appropriate value to the register 220 (FIG. 5) indicating the size of the data being transferred to satisfy the pending write request. The CPU $114_1$ also writes the source start address (the first address of the data such as can be temporarily buffered $200_1$ or stored in memory $118_1$ or otherwise identified) to the register 222 (FIG. 5). The CPU $114_1$ also writes the first destination start address (the first address of the data as will be buffered $200_2$ or stored temporarily in memory $118_2$) to the register 224 (FIG. 5). Other destination start addresses are likewise written as needed where multiple (such as redundant) copies are to be stored. After the registers 220, 222, 224 are set up, the CPU $114_1$ can write the appropriate value to the register 226 (FIG. 7) to instruct the DMA $116_1$ to actually begin performing participatory control of the data transfer. Importantly, the CPU $114_1$ does not perform any participatory control of the data transfer associated with satisfying the access request.

When the DMA registers for a data transfer satisfying the remote write command are completed, the DMAC $116_1$ enables the bus 164 with regard to a communication port of the buffer $200_1$. The DMAC $114_1$ registers also inform a routing control $230_1$ (FIG. 4) that prevents errant data transfer communication to the buffer $200_1$, by "fencing" off any DMA transfers to the buffer $200_2$ until such time that the remote buffer $200_2$ has acknowledged that it is in a mode conducive for receiving a transfer of one or more blocks of DMA data from the buffer $200_1$.

After the DMAC $116_1$ enables the link 164 and receives ready-acknowledgment from the buffer $200_2$, the DMAC $116_1$ transfers the first block of data in accordance with the DMA source and destination registers 222, 224 (FIG. 5). This process continues for the second, third, to the $n^{th}$ block of data as defined by the DMA size register 220 (FIG. 5). If the DMA transfer destination is occurring to a memory space instead of a single-address port, then the DMAC $116_1$ increments the DMA source and destination addresses 222, 224 each time the next block of data is transferred.

Receipt of the first transferred data in the buffer $200_2$ in block 312 triggers in block 314 a register setting that informs the DMAC $116_2$ of the need to perform a DMA transfer of the data from the buffer $200_2$ to the storage device $110_2$. As described above, the CPU $114_2$ writes the appropriate value to the register 220 (FIG. 5) indicating the size of the data being transferred. The CPU $114_2$ also writes the source start address (the first address of the data such as can be temporarily buffered $200_2$ or stored in memory $118_2$ or otherwise identified) to the register 222 (FIG. 5). The CPU $114_2$ also writes the first destination start address (the first address in the storage device $110_2$) to the register 224 (FIG. 5). After the registers 220, 222, 224 are set up, the CPU $114_2$ can write the appropriate value to the register 226 (FIG. 5) to instruct the DMAC $116_2$ to begin the data transfer.

Figure 7:
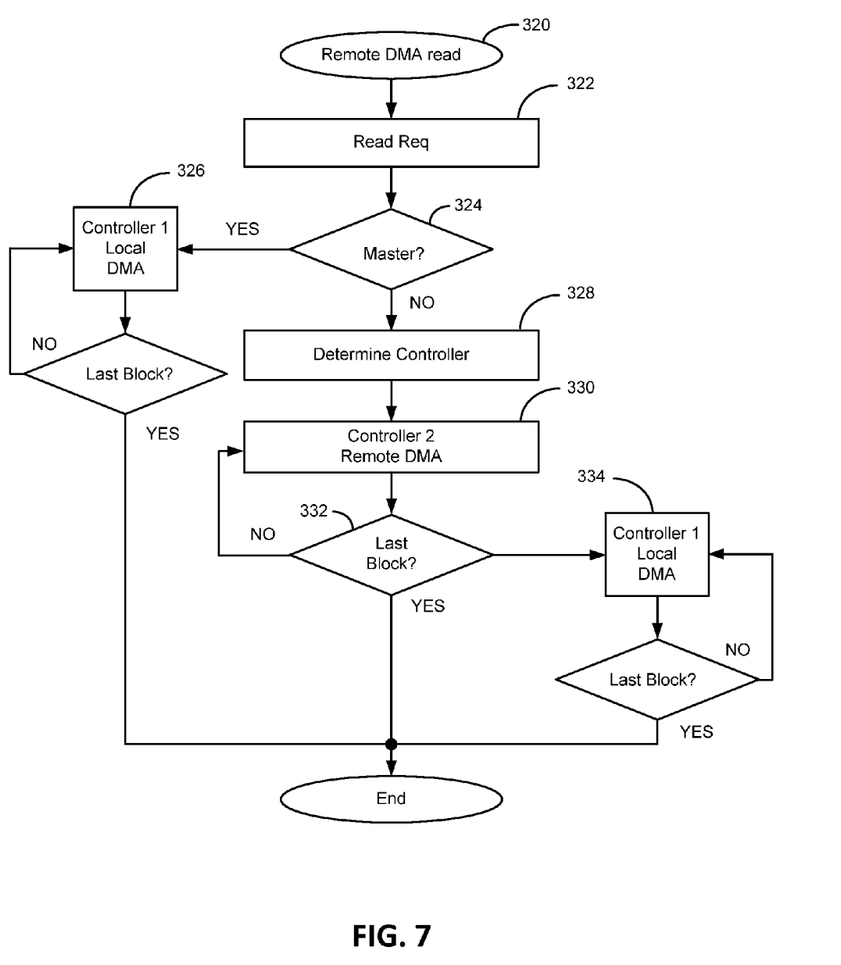
FIG. 7 is a flowchart depicting steps in a method for REMOTE DMA READ in accordance with embodiments of the present invention.

When the DMA registers for a data transfer are completed, the DMAC $116_2$ enables the bus $240_2$ (FIG. 4) and a bus select module $242_2$ with regard to a communication port of the buffer $200_2$. After the DMAC $116_2$ enables the link $240_2$ and receives ready-acknowledgment from the storage device $110_2$, the DMAC $116_2$ transfers the first block of data in accordance with the DMA source and destination registers 222, 224 (FIG. 7). This process continues for the second, third, to the $n^{th}$ block of data as defined by the DMA size register 220 (FIG. 7). The DMA transfers by the DMAC $116_1$ from the buffer $200_1$ to the buffer $200_2$ and by the DMAC $116_2$ from the buffer $200_2$ to the storage device $110_2$ can advantageously occur simultaneously and, as described, with no participatory control by the CPU $114_1$.

FIG. 7 is a flowchart depicting steps in a method 320 for a REMOTE DMA READ in accordance with illustrative embodiments of the present invention, generally a reverse of the REMOTE DMA WRITE method 300 described above.

The method 320 begins in the illustrative embodiments when in block 322 the storage controller $108_1$ receives an access request to read data from the storage space. In block 324 the data pathway logic $124_1$ executes stored computer instructions that compare the storage address(es) of the read request to the window of storage space mastered by the recipient storage controller $108_1$. If that comparison determines that the storage controller $108_1$ masters the storage space corresponding to the read request then control passes to block 326 where the CPU $114_1$ processes the read request locally to completion.

If, on the other hand, the determination of block 324 is that the storage space corresponding to the pending read request is not mastered by the controller $108_1$, then the CPU $114_1$ in block 328 indexes the routing table $210_1$ by the read request address to determine which one or more of the storage devices $110_n$ includes storage space corresponding to the read request. For purposes of this illustrative description it will be assumed the determination was made that storage device $110_2$ is the only such storage device of concern, and as such the DMA transfer is described in the following as occurring only from that storage device $110_2$. However, in alternative equivalent embodiments two or more candidate storage devices $110_n$ can be identified, for the same reasons and leveraged for the same advantages as described above.

With the target controller $108_n$ identified, controller $108_2$ for purposes of this illustrative example, the CPU $114_1$ in block 330 initializes data structures that perform the participatory control of a remote DMA transfer by communicating to the CPU $114_2$ via the remote link 164 to write the appropriate value to the register 220 (FIG. 5) indicating the size of the data being transferred to satisfy the pending read request. The CPU $114_2$ also writes the source start address (the first address of the storage device $110_2$) to the register 222 (FIG. 5). The CPU $114_2$ also writes the first destination start address (the first address of the data as will be buffered $200_1$ or stored temporarily in memory $118_1$) to the register 224 (FIG. 5). Other destination start addresses are likewise written as needed where multiple (such as redundant) copies are to be stored. After the registers 220, 222, 224 are set up, the CPU $114_2$ can write the appropriate value to the register 226 (FIG. 5) to instruct the DMAC $116_2$ to begin the data transfer.

When the DMA registers for a data transfer satisfying the remote read command are completed, the DMAC $116_2$ enables the bus 164 (FIG. 4) with regard to a communication port of the buffer $200_2$. The DMAC $114_2$ registers also inform a routing control $230_2$ that prevents errant data transfer communication to the buffer $200_2$, by "fencing" off any DMA transfers to the buffer $200_1$ until such time that the remote buffer $200_1$ has acknowledged that it is in a mode conducive for receiving a transfer of one or more blocks of DMA data from the buffer $200_2$.

After the DMAC $116_2$ enables the link 164 and receives ready-acknowledgment from the buffer $200_1$, the DMAC $116_2$ transfers the first block of data in accordance with the DMA source and destination registers 222, 224 (FIG. 5). This process continues for the second, third, to the $n^{th}$ block of data as defined by the DMA size register 220 (FIG. 7). If the DMA transfer destination is occurring to a memory space instead of a single-address port, then the DMAC $116_2$ increments the DMA source and destination addresses $222_2$, $224_2$ each time the next block of data is transferred.

Receipt of the first transferred data in the buffer $200_1$ in block 332 triggers in block 334 a register setting that informs the DMAC $116_1$ of the need to perform a DMA transfer of the data from the buffer $200_1$ to the client-requestor 102 via the network 106. As described above, the CPU $114_1$ writes the appropriate value to the register 220 (FIG. 5) indicating the size of the data being transferred. The CPU $114_1$ also writes the source start address (the first address of the data such as can be temporarily buffered $200_1$ or stored in memory $118_1$ or otherwise identified) to the register 222 (FIG. 5). The CPU $114_1$ also writes the first destination start address (the first address in the client-requestor 102) to the register 224 (FIG. 5). After the registers 220, 222, 224 are set up, the CPU $114_1$ can write the appropriate value to the register 226 (FIG. 5) to instruct the DMA $116_1$ to begin the data transfer.

When the DMA registers for a data transfer are completed, the DMAC $116_1$ enables the bus $250_1$ (FIG. 4) with regard to a communication port of the I/O interface $120_1$. After the DMAC $116_1$ enables the link $250_1$ and receives ready-acknowledgment from the client-requestor 102, the DMAC $116_1$ transfers the first block of data in accordance with the DMA source and destination registers 222, 224 (FIG. 5). This process continues for the second, third, to the $n^{th}$ block of data as defined by the DMA size register 220 (FIG. 5). The DMA transfers by the DMAC $116_1$ from the buffer $200_1$ to the client-requestor 102 and by the DMAC $116_2$ from the storage device $110_2$ to the buffer $200_1$ can advantageously occur with no participatory control of the CPUs $114_1$, $114_2$.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, remote accesses to multiple or even predetermined pluralities of data storage drives can be interleaved by the data pathway logic in performing the remote access processes for example, while still maintaining substantially the same functionality without departing from the scope and spirit of the claimed invention. Another example can include using these techniques across multiple storage partitions, while still maintaining substantially the same functionality without departing from the scope and spirit of the claimed invention. Further, though communication is described herein as between a client and the data storage array, communication can be received directly by a data storage drive, via the interface device 120 for example, without departing from the scope and spirit of the claimed invention. Further, for purposes of illustration, a tape cartridge operably mounted in a tape drive can define the data storage drive in illustrative embodiments of the present invention. Finally, although the preferred embodiments described herein are directed to data storage drive systems, and related technology, it will be appreciated by those skilled in the art that the claimed invention can be applied to other systems, without departing from the spirit and scope of the present invention.

From the foregoing it will be understood that the reverse situation is possible in the same manner without the need for further detailed description. That is, generally, the controller $108_2$ can satisfy a remote write request for data stored in storage device $110_1$ by combining a remote DMA transfer to the buffer $200_1$ in controller $108_1$ with a local DMA transfer commanded of controller $108_1$ to the storage device $110_1$. Likewise, the controller $108_2$ can satisfy a remote read request for data stored in storage device $110_1$ by combining a commanded remote DMA transfer by the controller $108_1$ to the buffer $200_2$ with a local DMA transfer to the host-requestor 102.

It will be clear that the claimed invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the claimed invention disclosed and as defined in the appended claims.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed is:

1. A data storage system comprising one or more processors and memory and configured to operably transferring data between a storage space and a processing client device via a network, the data storage system further comprising:
   a first storage controller having top-level control of a first data storage device, the first data storage device forming a portion of the storage space;
   a second storage controller having top-level control of a second data storage device that is different than the first data storage device, the second data storage device forming another portion of the storage space;
   a first data storage buffer in the first storage controller and a second data storage buffer in the second storage controller;
   a first direct memory access (DMA) controller having a size register operably storing a size of a first user data set corresponding to a write request from the processing client device for the second data storage device, a source register operably storing a source address of the first data storage buffer, a destination register operably storing a destination address of the second data storage buffer, and configured to increment the first source and destination registers after transferring a portion of the first user data set from the first data storage buffer to the second data storage buffer;
   a second DMA controller having a second size register operably storing the size of the first user data set, a second source register operably storing a source address of the second data storage buffer, a second destination register operably storing a destination address of the second data storage device, and configured to increment the second source and destination registers after transferring a portion of the first user data set from the second data storage buffer to the second data storage device; and wherein the first and the second DMA controllers are configured to respond to a read request from the processing client device for a second user data set that is stored redundantly in the first and second storage devices by transferring the second user data set from a selected one of the first and second data storage devices depending on which can first make the data available.

2. The data storage system of claim 1 further comprising a routing table operably mapping at least a portion of the storage space, the second DMA controller indexing the routing table in populating a second destination register.

3. The data storage system of claim 2 wherein the first data storage controller indexes the routing table to determine whether the write request redundantly stores the first user data set in the first data storage device, and if so performs a DMA transfer of the first user data set to the first data storage device.

4. The data storage system of claim 1 wherein the second DMA controller satisfies the read request by performing a DMA transfer from the second data storage device to the first data storage buffer.

5. The data storage system of claim 4 wherein the first DMA controller performs a DMA transfer from the first data storage buffer to the processing client device.

6. The data storage system of claim 1 wherein the selected one of the first and second data storage devices is based on characteristically different data throughput performance capabilities.

7. The data storage system of claim 1 wherein the selected one of the first and second data storage devices is based on comparing sizes of DMA queues in the first and second DMA controllers.

8. The data storage system of claim 2 comprising three or more DMA controllers each having top-level control of respective data storage devices and indexing the routing table to identify all of the DMA controllers having control of a redundant copy of the first user data set corresponding to the read request.

* * * * *